United States Patent
Ishida

(10) Patent No.: US 6,791,967 B1
(45) Date of Patent: Sep. 14, 2004

(54) WIRELESS BASE STATION

(75) Inventor: Akira Ishida, Hirakata (JP)

(73) Assignee: Sanyo Electric Co., Ltd., Osaka (JP)

(*) Notice: Subject to any disclaimer, the term of this patent is extended or adjusted under 35 U.S.C. 154(b) by 883 days.

(21) Appl. No.: 09/715,086

(22) Filed: Nov. 20, 2000

(30) Foreign Application Priority Data

Nov. 19, 1999 (JP) .......................................... 11-330705

(51) Int. Cl.[7] .................................................. H04J 3/00
(52) U.S. Cl. ........................ 370/345; 370/334; 370/337
(58) Field of Search ................................. 370/345, 277, 370/278, 310, 328, 329, 332, 333, 334, 336, 337, 347, 442, 498; 375/346, 347, 259; 455/450, 561, 562.1, 63.1

(56) References Cited

FOREIGN PATENT DOCUMENTS

| JP | 09-219615 | 8/1997 |
| JP | 10-070502 | 3/1998 |

Primary Examiner—Brian Nguyen
(74) Attorney, Agent, or Firm—Arent Fox PLLC

(57) ABSTRACT

A wireless base station that has a plurality of antennas and repeatedly executes a cycle where reception and transmission are performed to communicate with a plurality of mobile stations at a same time using an adaptive array method. During reception in a cycle, the wireless base station calculates first weight vectors for forming directivity patterns and uses the first weight vectors during transmission to form the same directivity patterns as during reception in a same cycle. When a reception error occurs during reception of a signal from an arbitrary mobile station, the wireless base station calculates, from current response vectors of other mobile stations, a second weight vector that is used in place of the first weight vector when forming a directivity pattern for the arbitrary mobile station during transmission in a same cycle as the reception error. This directivity pattern has null directivity for the other mobile stations.

4 Claims, 13 Drawing Sheets

FIG.1
(a)
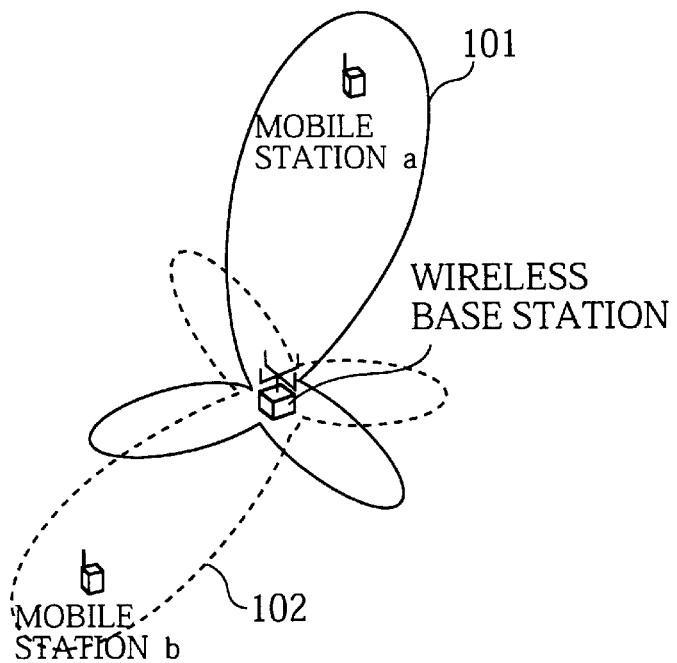
(b)
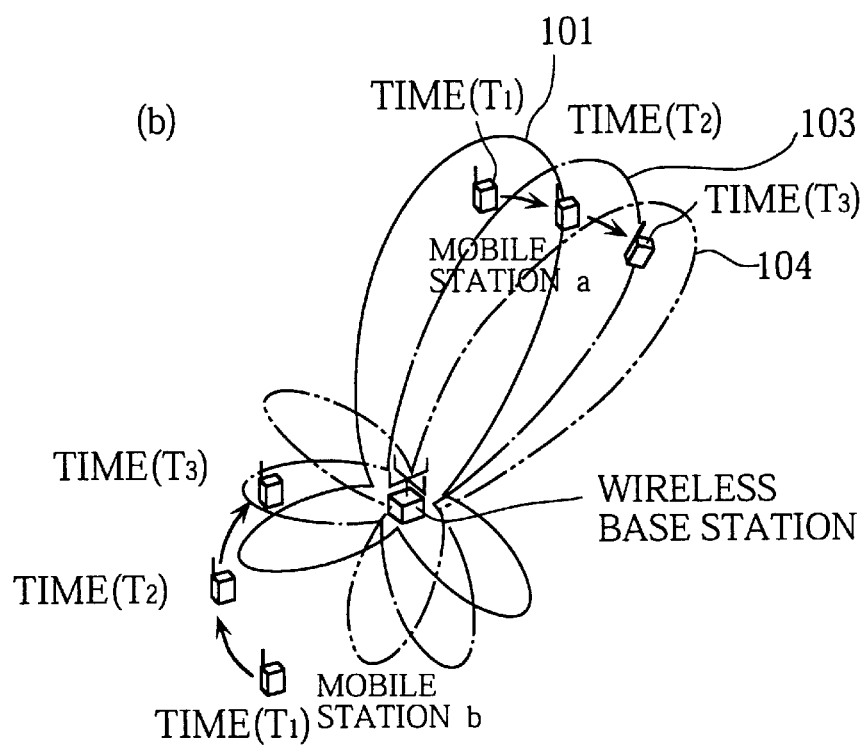

FIG. 7

|  | SECOND-SIXTH TIMESLOTS | THIRD-SEVENTH TIMESLOTS | FOURTH-EIGHTH TIMESLOTS |
|---|---|---|---|
| USER PROCESSING UNIT51A | MOBILE STATION a | | |
| USER PROCESSING UNIT51B | MOBILE STATION b | | |
| USER PROCESSING UNIT51C | | MOBILE STATION c | |
| USER PROCESSING UNIT51D | | | MOBILE STATION d |

FIG. 9A

| | SECOND TIMESLOT | THIRD TIMESLOT | FOURTH TIMESLOT | SIXTH TIMESLOT | SEVENTH TIMESLOT | EIGHTH TIMESLOT |
|---|---|---|---|---|---|---|
| USER PROCESSING UNIT 51A | X1~4 INPUT | | | UTa INPUT | | |
| USER PROCESSING UNIT 51B | X1~4 INPUT | | | UTb INPUT | | |
| USER PROCESSING UNIT 51C | | X1~4 INPUT | | | UTc INPUT | |
| USER PROCESSING UNIT 51D | | | X1~4 INPUT | | | UTd INPUT |

FIG. 9B

| | SECOND TIMESLOT | THIRD TIMESLOT | FOURTH TIMESLOT | SIXTH TIMESLOT | SEVENTH TIMESLOT | EIGHTH TIMESLOT |
|---|---|---|---|---|---|---|
| USER PROCESSING UNIT 51A | CALCULATION OF Wa FOR MOBILE STATION A. SIGNALS WEIGHTED USING Wa AND COMBINED | | | SIGNAL WEIGHTED USING Wa | | |
| USER PROCESSING UNIT 51B | CALCULATION OF Wb FOR MOBILE STATION B. SIGNALS WEIGHTED USING Wb AND COMBINED | | | SIGNAL WEIGHTED USING Wb | | |
| USER PROCESSING UNIT 51C | | CALCULATION OF Wc FOR MOBILE STATION C. SIGNALS WEIGHTED USING Wc AND COMBINED | | | SIGNAL WEIGHTED USING Wc | |
| USER PROCESSING UNIT 51D | | | CALCULATION OF Wd FOR MOBILE STATION D. SIGNALS WEIGHTED USING Wd AND COMBINED | | | SIGNAL WEIGHTED USING Wd |

FIG. 9C

| | SECOND TIMESLOT | THIRD TIMESLOT | FOURTH TIMESLOT | SIXTH TIMESLOT | SEVENTH TIMESLOT | EIGHTH TIMESLOT |
|---|---|---|---|---|---|---|
| USER PROCESSING UNIT 51A | OUTPUT OF COMBINED SIGNAL URa | | | OUTPUT OF DISTRIBUTED SIGNALS Sa1 TO Sa4 | | |
| USER PROCESSING UNIT 51B | OUTPUT OF COMBINED SIGNAL URb | | | OUTPUT OF DISTRIBUTED SIGNALS Sb1 TO Sb4 | | |
| USER PROCESSING UNIT 51C | | OUTPUT OF COMBINED SIGNAL URc | | | OUTPUT OF DISTRIBUTED SIGNALS Sc1 TO Sc4 | |
| USER PROCESSING UNIT 51D | | | OUTPUT OF COMBINED SIGNAL URd | | | OUTPUT OF DISTRIBUTED SIGNALS Sd1 TO Sd4 |

FIG. 10

| | SECOND TIMESLOT | THIRD TIMESLOT | FOURTH TIMESLOT | SIXTH TIMESLOT | SEVENTH TIMESLOT | EIGHTH TIMESLOT |
|---|---|---|---|---|---|---|
| INPUT | | INPUT OF SIGNALS X1 TO X4 FROM THE ANTENNAS | INPUT OF SIGNALS X1 TO X4 FROM THE ANTENNAS | TRANSMISSION SIGNAL UTa FOR MOBILE STATION a, TRANSMISSION SIGNAL UTb FOR MOBILE STATION b | TRANSMISSION SIGNAL UTc FOR MOBILE STATION c | TRANSMISSION SIGNAL UTd FOR MOBILE STATION d |
| OUTPUT | RECEPTION SIGNAL URa FOR MOBILE STATION a, RECEPTION SIGNAL URb FOR MOBILE STATION b | RECEPTION SIGNAL URc FOR MOBILE STATION c | RECEPTION SIGNAL URd FOR MOBILE STATION d | OUTPUT SIGNALS S1 TO S4 FOR THE ANTENNAS | OUTPUT SIGNALS S1 TO S4 FOR THE ANTENNAS | OUTPUT SIGNALS S1 TO S4 FOR THE ANTENNAS |

FIG. 11A

| | SECOND TIMESLOT | THIRD TIMESLOT | FOURTH TIMESLOT |
|---|---|---|---|
| USER PROCESSING UNIT51A | RESPONSE VECTOR Ra FOR MOBILE STATION a | | |
| USER PROCESSING UNIT51B | RESPONSE VECTOR Rb FOR MOBILE STATION b | | |
| USER PROCESSING UNIT51C | | RESPONSE VECTOR Rc FOR MOBILE STATION c | |
| USER PROCESSING UNIT51D | | | RESPONSE VECTOR Rd FOR MOBILE STATION d |

FIG. 11B

| | FRAME(T1) | | | | FRAME(T2) | | | | FRAME(T3) | | | |
|---|---|---|---|---|---|---|---|---|---|---|---|---|
| | SECOND TIMESLOT | THIRD TIMESLOT | FOURTH TIMESLOT | | SECOND TIMESLOT | THIRD TIMESLOT | FOURTH TIMESLOT | | SECOND TIMESLOT | THIRD TIMESLOT | FOURTH TIMESLOT | |
| USER PROCESSING UNIT51A | RESPONSE VECTOR Ra (T1) | | | | RESPONSE VECTOR Ra (T2) | | | | RESPONSE VECTOR Ra (T3) | | | |
| USER PROCESSING UNIT51B | RESPONSE VECTOR Rb (T1) | | | | RESPONSE VECTOR Rb (T2) | | | | RESPONSE VECTOR Rb (T3) | | | |
| USER PROCESSING UNIT51C | | RESPONSE VECTOR Rc (T1) | | | | RESPONSE VECTOR Rc (T2) | | | | RESPONSE VECTOR Rc (T3) | | |
| USER PROCESSING UNIT51D | | | RESPONSE VECTOR Rd (T1) | | | | RESPONSE VECTOR Rd (T2) | | | | RESPONSE VECTOR Rd (T3) |

WIRELESS BASE STATION

BACKGROUND OF THE INVENTION

1. Field of the Invention

The present invention relates to a wireless base station that performs spatially multiplexed communication with a plurality of mobile stations by adjusting the signals to and from a plurality of antennas to form directivity patterns during reception and transmission. In particular, the invention relates to an improvement in the formation of directivity patterns.

2. Description of the Related Art

In recent years, increasing attention has been given to mobile communication methods that use adaptive arrays to make efficient use of frequencies and improve the quality of communication. In such methods, a plurality of antennas are used, with the signal amplitude and phase being controlled separately for each antenna to adaptively control the direction in which signals propagate. A wireless base station that uses an adaptive array method controls a plurality of non-directional antennas and forms a directivity pattern where the reception sensitivity or transmission intensity is high in a direction in which a signal has been received from a mobile station when communicating with that mobile station. Here, the expression "directivity pattern" refers to a representation of the intensity of signals that are transmitted or received in different directions by a group of antennas.

A wireless base station can form a directivity pattern that has high directivity in a direction in which a signal has been received from a mobile station and simultaneously has a "null" directivity,toward other mobile stations. Here, "null directivity" means that the pattern does not extend in a certain direction, or in other words, strong signals are not transmitted in that direction and reception is not sensitive to signals in that direction. By forming an optimal directivity pattern separately for each of a plurality of mobile stations, a wireless base station can simultaneously communicate with a plurality of mobile stations. This method is called "spatial multiplexing".

FIG. 1A shows two examples of directivity patterns that are formed when a wireless base station communicates with two mobile stations using spatial multiplexing. The wireless base station forms the directivity pattern 101 with a high directivity for the mobile station a and null directivity for the mobile station b and simultaneously forms the directivity pattern 102 with a high directivity for the mobile station b and null directivity for the mobile station a.

The wireless base station changes the directivity pattern to track the movement of the mobile stations. One way of tracking such movement is as follows. The wireless base station communicates with a mobile station using time-division multiplexing where each frame is only several milliseconds (such as five milliseconds) long. When performing reception within a frame, the wireless base station adjusts the directivity pattern so that a predetermined signal located at the start of each frame is received properly. The wireless base station receives the payload of the reception signal using this adjusted directivity pattern, and then transmits a signal to the mobile station using the same directivity pattern that was used during reception within the same frame.

FIG. 1B shows the directivity patterns formed by a wireless base station, which is communicating via spatial multiplexing with the mobile stations a and b, for communication with the mobile station a. This drawing shows the respective positions of the mobile stations a and b at the times T1, T2, and T3. The times T1, T2, and T3 correspond to the consecutive frames T1, T2, and T3, so that the wireless base station forms the directivity patterns 101, 103, and 104 from the predetermined signals received from the mobile station a as part of each frame. When performing transmission within frames, the wireless base station forms the same directivity patterns 101, 103, and 104 as those used during reception in the same frames. In this way, wireless base station transmits and receives signals by forming directivity patterns in frame units for the mobile station a. When these directivity patterns are optimally formed, there is directivity toward the mobile station b is definitely "null", as shown in FIG. 1B. The wireless base station also generates directivity patterns that track the movement of the mobile station b for communication with the mobile station b. These directivity patterns are formed in the same way as the directivity patterns produced for the mobile station a.

The wireless base station forms and adjusts directivity patterns by applying weightings to the transmission and reception signals of each antenna using a set of parameters and then combining the weighted signals. A set of such parameters is called a "weight vector". The wireless base station sets a certain weight vector as an initial value. The wireless base station then receives a predetermined signal from a mobile station, such as a preamble or a synch word (or unique word), via each antenna and adds a weighting to the signal received by each antenna using the weight vector. A combined signal produced by combining these weighted signals is compared with a reference signal that is stored in advance, and the weight vector is adjusted so as to minimize the difference between the combined signal and the reference signal. By repeating this process of weighting and combining signals, comparing the combined signal with a reference signal, and adjusting the weight vector at predetermined intervals, the weight vector can be made to converge on an optimal vector around the time the payload of the signal is received from a mobile station.

The wireless base station receives the payload by using the converged weight vector to apply a weighting to each signal corresponding to the payload that is received by the antennas. During transmission, a transmission signal for the mobile station is distributed to each antenna. At this point, the transmission signal to be transmitted by each antenna is weighted using the weight vector calculated during reception in the same frame, and a weighted transmission signal is transmitted by each antenna.

In addition to using an adaptive array, the wireless base station is constructed so as to communicate using time-division multiplexing according to a TDMA/TDD (Time Division Multiple Access/Time Division Duplex) method where four channels are multiplexed together. FIG. 2 shows one example of a TDMA/TDD frame when communication is performed using both spatial multiplexing and time-division multiplexing.

The period covered by the illustrated TDMA/TDD frame is divided into eight timeslots that are numbered one to eight. The first to fourth timeslots are upstream timeslots for transmission from mobile stations to the wireless base station and the fifth to eighth timeslots are downstream timeslots for transmission from the wireless base station to mobile stations.

In the second and sixth timeslots, the wireless base station performs transmission and reception for the mobile stations a and b using spatial multiplexing. In the third and seventh timeslots, the wireless base station performs transmission and reception to the mobile station c. In the fourth and eighth timeslots, the wireless base station performs transmission and reception to the mobile station d. By performing both time-division multiplexing and spatial multiplexing, the wireless base station can simultaneously communicate with a number of mobile stations given as the number of the mobile stations that can be simultaneously handled by time-division multiplexing multiplied by the number of stations that can be handled by spatial multiplexing.

Due to problems such as weak electrical fields, interference, and losses of synchronization, there are cases where the wireless base station cannot calculate a weight vector for generating an optimal directivity pattern from the received signals. This is because the weight vector does not converge to the optimal value. An inappropriate directivity pattern is formed using this non-optimal weight vector. Such a pattern does not have directivity towards the intended mobile station or null directivity towards the other mobile stations. This problem is especially severe when the wireless base station is constructed to use the weight vector of a previous frame as the initial value for the weight vector of the present frame, as the adverse effects of earlier frames will continuously affect later frames. This prevents normal communication from being restored.

In order to stop such problems occurring when there are weak electric fields, interference, losses of synchronization, or the like, during transmission the wireless base station does not use an inappropriate weight vector that was calculated during reception. Instead, the wireless base station forms a directivity pattern using the weight vector that was calculated in the preceding frame. Since mobile stations do not move by much during the short time that is equivalent to one frame, there is a higher probability of a directivity pattern of the preceding frame being directed towards the intended mobile station that an inappropriate directivity pattern being directed in this way. This lowers the probability of the adverse effects spreading to later frames.

Weak electric fields, interference and losses of synchronization can be detected by monitoring for reception errors. Reception errors are judged to occur when a wireless base station cannot detect a predetermined synch word or when a CRC (Cyclic Redundancy Check) error is detected.

FIG. 3 shows one example of when the wireless base station detects a reception error when receiving signal from the mobile station a. As shown in FIG. 3, the wireless base station communicates using spatial multiplexing in the second and sixth timeslots in each of frames (T1), (T2), and (T3). The wireless base station is assumed to detect a reception error when receiving a signal from the mobile station a in frame (T3). The legends T1, T2, and T3 here show the times of each frame.

The following describes the operation of the wireless base station in order of the frames. In the second timeslot of frame (T1), the wireless base station receives predetermined signals from the mobile stations a and b and calculates the weight vectors Wa(T1) and Wb(T1). The wireless base station then uses these vectors when receiving the payloads of the signals received from these mobile stations a and b. In the sixth timeslot in the-frame (T1), the wireless base station uses these weight vectors Wa(T1) and Wb(T1) again to transmit respective signals to the mobile stations a and b.

In the same way, in frame (T2) the wireless base station calculates the weight vectors Wa(T2) and Wb(T2) and receives signals from the mobile stations a and b, before using the same weight vectors Wa(T2) and Wb(T2) when transmitting the transmission signals. After this, in frame (T3), the wireless base station calculates the weight vectors Wa(T3) and Wb(T3) from the predetermined signals in the signals received from the mobile stations a and b. In this example, the wireless base station detects a reception error in the signal received from the mobile station a in this frame (T3). During transmission it is inappropriate to use the weight vector Wa(T3) calculated when this reception error occurred, so that the wireless base station uses the weight vector Wa(T2) calculated for the preceding frame when transmitting to the mobile station a and the weight vector Wb(T3) when transmitting to the mobile station b.

When the same directivity pattern is formed as in the preceding frame, however, there are cases where the pattern does not have null directivity toward mobile stations that are not the intended mobile station. In this case, there is the problem of the communication between the wireless base station and the non-intended mobile station being hindered.

FIG. 4 shows a specific example of the above situation. As in FIG. 1B, the wireless base station is communicating with the mobile stations a and b using spatial multiplexing, with FIG. 4 showing the directivity patterns generated by the wireless base station for communication with the mobile station a. As in FIG. 1B, the mobile stations a and b move and are positioned as shown in FIG. 4 at the points T1, T2, and T3. These times T1, T2, and T3 correspond to the successive frames (T1), (T2) and (T3). In this example, the wireless base station forms optimal directivity patterns 101 and 103 from the predetermined signals in the signals received from the mobile station a during the frames (T1) and (T2), and forms the same directivity patterns during transmission in the same frames.

FIG. 4 differs from FIG. 1B in that the wireless base station detects that a reception error has occurred during the reception of signals from the mobile station a in frame (T3). The wireless base station is not capable of forming the directivity pattern 104 that should be formed and instead performs transmission using the same directivity pattern 103 as the preceding frame.

In this example, the mobile station b moves from the position shown for time T2 to the position shown for time T3. As a result, the mobile station b enters one of the lobes of the directivity pattern 103, so that the directivity pattern 103 has a high directivity toward both the mobile station a and the mobile station b. This means that at time T3, both the directivity pattern formed for the mobile station b (not illustrated) and the directivity pattern 103 formed for the mobile station a have a high directivity for the mobile station b, and that the signals transmitted to the mobile station b from the wireless base station are subject to interference by the directivity pattern 103. In this way, communication between the wireless base station and the mobile station b is hindered.

SUMMARY OF THE INVENTION

It is an object of the present invention to provide a wireless base station that can communicate with a mobile station for which a reception error has occurred by forming a directivity pattern that has a null directivity for other mobile stations.

The stated object can be achieved by a wireless base station that uses time-division duplexing and communicates with a plurality of mobile stations, the wireless base station repeatedly executing a cycle including a reception period and a transmission period, the reception period being where the wireless base station calculates a first weight vector for each of a plurality of mobile stations and obtains transmission signals transmitted by the plurality of mobile stations by weighting signals received by a plurality of antennas using the calculated first weight vectors for the mobile stations, the transmission period being where the wireless base station transmits signals, which have been weighted using the first weight vectors corresponding to the mobile stations, to the plurality of mobile stations via the plurality of antennas, wherein during the reception period in a cycle, if the wireless base station detects an error in a signal obtained from an arbitrary mobile station, the wireless base station calculates, from current response vectors of other mobile stations, a second weight vector that has null directivity for the other mobile stations, and during the transmission period in the same cycle as the reception period where the error is detected, the wireless base station weights a signal transmitted to the arbitrary mobile station using the second weight vector instead of using a first weight vector and transmits the weighted signal via the plurality of antennas.

As a result, the directivity pattern formed for a mobile station for which a reception error has occurred is not directed toward other mobile stations. This means that communication with this mobile station does not interfere with the directivity patterns of other mobile stations. The wireless base station can therefore communicate with the other mobile stations as normal.

The stated object can also be achieved by a wireless base station that uses a time-division duplexing and communicates with a plurality of mobile stations, the wireless base station repeatedly executing a cycle composed of a reception period where signals are received from mobile stations and a transmission period where signals are transmitted to mobile stations, the wireless base station including: a reception unit for calculating, during the reception period in a cycle, a first weight vector for each of a plurality of mobile stations, and for weighting signals received via a plurality of antennas using the calculated first weight vectors to obtain a received signal for each of the mobile stations; a transmission unit for transmitting, during the transmission period in a cycle, signals to each mobile station via the plurality of antennas, the signal transmitted to each mobile station having been weighted using the first weight vector corresponding to the mobile station; and a detection unit for detecting, during the reception period in a cycle, whether an error has occurred in a signal obtained for any of the mobile stations, wherein when the detection means detects an error in a signal obtained for an arbitrary mobile station, the transmission unit calculates a second weight vector for the arbitrary mobile station based on current response vectors for other mobile stations and uses the calculated second weight vector in place of a first weight vector to weight the signal transmitted to the arbitrary mobile station in the transmission period in a same cycle as the reception period in which the error occurred.

With the stated construction, when a reception error occurs, the directivity pattern formed by the transmission unit using the second vectors has a null directivity towards other mobile stations. This means that communication with the mobile station for which the reception error occurred does not interfere with the directivity patterns of other mobile stations, so that the wireless base station can communicate with the other mobile stations as normal.

Here, the transmission unit may include: a first calculating unit for calculating a response vector for each mobile station based on input signals inputted by each antenna and the obtained signal for each mobile station; and a second calculating unit for calculating, when the detecting unit detects that an error has occurred for an arbitrary mobile station, a second weight vector that cancels out components of the response vectors of other mobile stations that are included in each of the input signals.

Here, the transmission unit may increase transmission power when transmitting a signal that has been weighted using a second weight vector.

As a result, transmission power is raised for the directivity pattern formed using the second vectors. This increases the probability of transmission signals reaching the mobile station for which the reception error occurred, and increases the probability of synchronization being successfully reestablished between the wireless base station and the mobile station.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1A shows an example where a wireless base station perform spatially multiplexed communication by forming directivity patterns for two mobile stations;

FIG. 1B shows the formation of directivity patterns that track the movement of the mobile station a when a wireless base station communicates with the mobile stations a and b using spatial multiplexing;

FIG. 3 shows an example where the wireless base station detects a reception error for the mobile station a;

FIG. 7 shows how the user processing units 51A to 51D and correspond to the mobile stations a to d;

FIG. 9A shows the signals inputted into the user processing units 51A to 51D in the upstream and downstream timeslots;

FIG. 9B shows the content of the processing by the user processing units 51A to 51D in the upstream and downstream timeslots;

FIG. 9C shows the signals outputted by the user processing units 51A to 51D in the upstream and downstream timeslots;

FIG. 10 shows the inputs into and outputs from the signal adjusting unit 51 in the upstream and downstream timeslots;

FIG. 11A shows one example of the stored content of the response vector memory 531;

FIG. 11B shows the stored content of the response vector memory 531 in the upstream timeslots of the frames (T1), (T2) and (T3);

FIG. 13 corresponds to FIG. 3 and shows one example of forced null control performed when a reception error occurs when the wireless base station 100 receives signals from the mobile station a.

DESCRIPTION OF THE PREFERRED EMBODIMENT

The following describes a wireless base station that is a first embodiment, with reference to the attached drawings.

The wireless base station of the present embodiment has four antennas and uses an adaptive array method to communicate with a maximum of four mobile stations by spatial multiplexing signals. The wireless base station also uses a TDMA/TDD method where each frame is split into eight timeslots. In this embodiment, the first and fifth timeslots are used for transmitting and receiving control signals, while the pair of the second and sixth timeslots, the pair of the third and seventh timeslots, and the pair of the fourth and eighth timeslots are used for communication. This means that communication can be performed with a maximum of three mobile stations in each frame by time-division multiplexing alone. The operation of the wireless base station of the present embodiment is explained for the example case where the wireless base station communicates with the mobile stations a, b, c, and d using the TDMA/TDD frame construction shown in FIG. 2.

Construction of the Wireless Base Station 100

Figure 5:
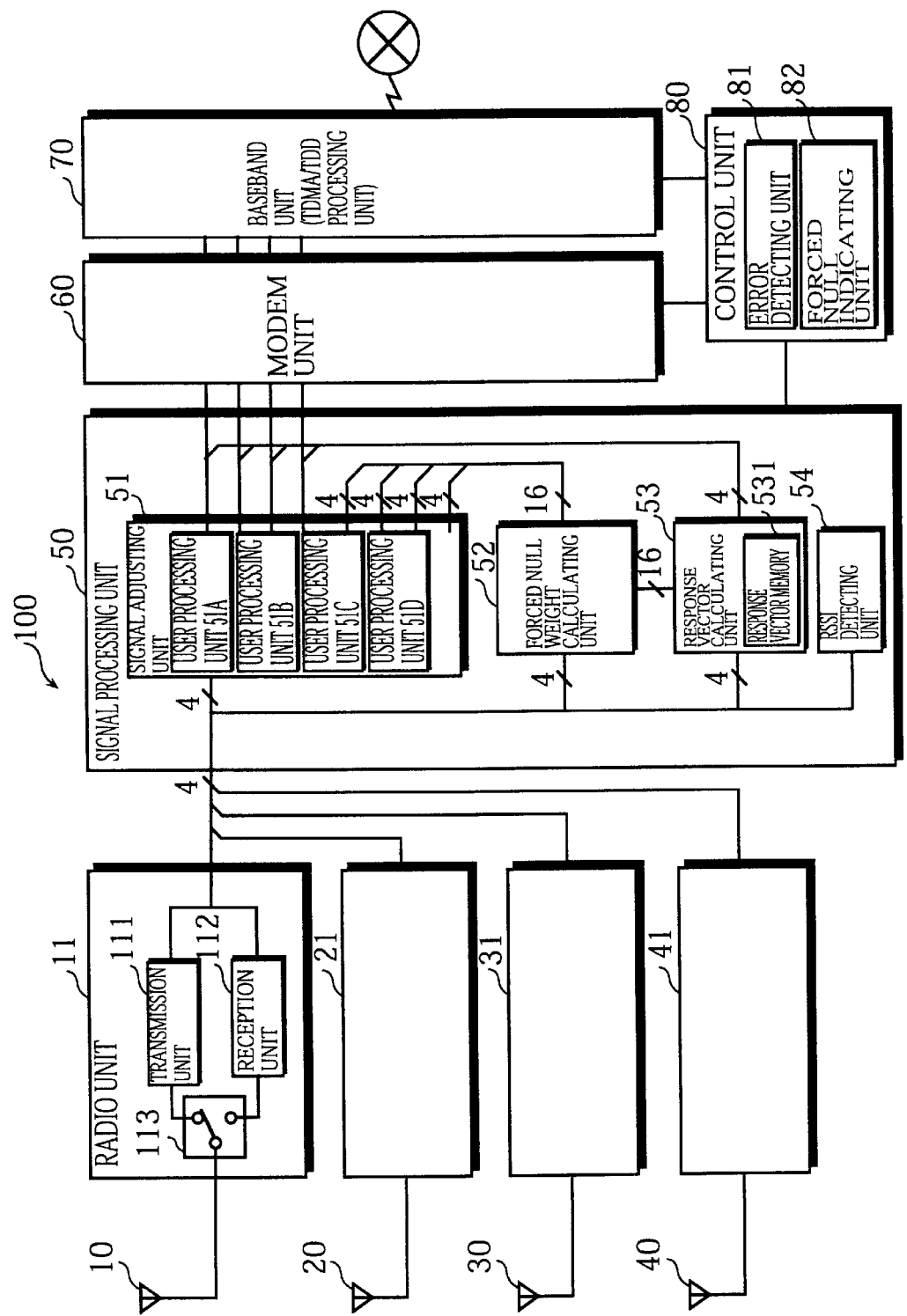
FIG. 5 is a block diagram showing the construction of a wireless base station 100 that is an embodiment of the present invention.

FIG. 5 is a block diagram showing the construction of a wireless base station 100 in the present embodiment. As shown in FIG. 5, the wireless base station 100 includes antennas 10 to 40, radio units 11 to 41, a signal processing unit 50, a modem unit 60, a baseband unit 70, and a control unit 80.

Radio Units 11 to 41

The radio units 11 to 41 are all the same, with the radio unit 11 being described as a representative example. The radio unit 11 includes a transmission/reception switch 113 for switching between reception and transmission depending on whether a present timeslot in a TDMA/TDD frame is an upstream timeslot or a downstream timeslot, a reception unit 112 for converting a high frequency signal received via the corresponding antenna 10 to a low frequency signal which it outputs to the signal processing unit 50, and a transmission unit 111 that converts a low frequency signal inputted from the signal processing unit 50 to a high frequency signal and amplifies the resulting high frequency signal. The radio units 21, 31, and 41 have the same construction.

Signal Processing Unit 50

In the upstream timeslots, the signal processing unit 50 receives an input of four signals from the radio units 11 to 41. These four signals correspond to a predetermined signal and a following payload that are transmitted by a mobile station. The signal processing unit 50 weights these four signals using a weight vector and combines them before comparing the combined signal with a reference signal and adjusting the weight vector. The signal processing unit 50 repeatedly performs this operation and so calculates an optimal weight vector. Having done so, the signal processing unit 50 uses the calculated weight vector to weight signals received from the radio units 11 to 41 corresponding to the payloads of the signals received from each mobile station, combines the weighted signals, and outputs the resulting combined signal to the modem unit 60.

In downstream timeslots, the signal processing unit 50 weights the transmission signal to be sent to a mobile station using the weight vector calculated in the corresponding upstream timeslot and outputs the weighted transmission signals to the radio units 11 to 41. When spatial multiplexing is performed, the signal processing unit 50 weights the transmission signals to be sent to the spatially multiplexed mobile stations using the corresponding weight vectors, multiplexes the weighted transmission signals for each radio unit, and outputs the resulting signals to the radio units 11 to 41.

Figure 2:
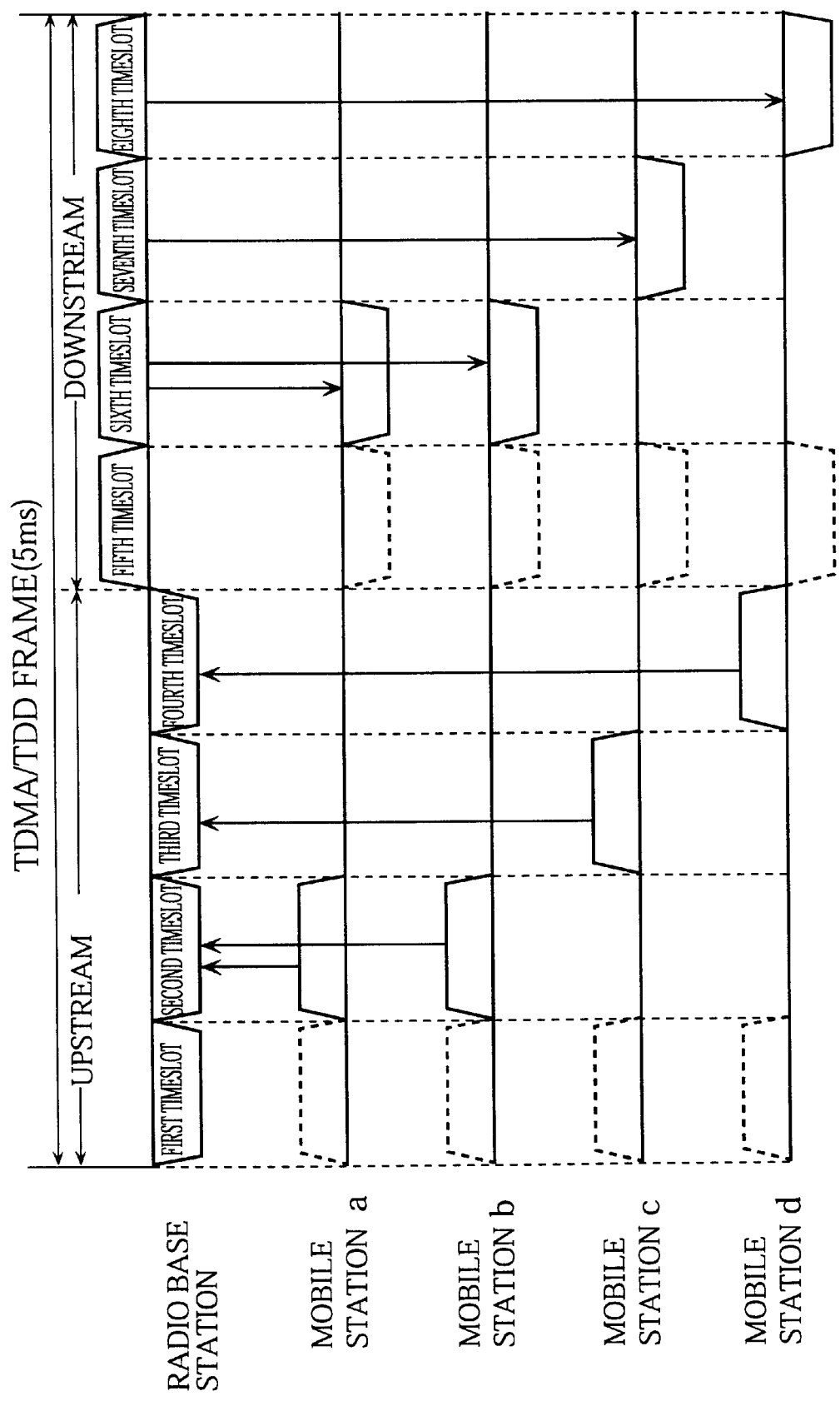
FIG. 2 show one example of the composition of a TDMA/TDD frame when both time-division multiplexing and spatial multiplexing are used.

In the example shown in FIG. 2, four signals corresponding to the predetermined signal are received from the mobile station c in the third timeslot. The signal processing unit 50 calculates the optimal weight vectors corresponding to the mobile station c and uses these weight vectors to weight the four signals that are inputted next corresponding to the payload. The signal processing unit 50 combines these weighted signals to produce a combined signal which it outputs to the modem unit 60. In the seventh timeslot, the signal processing unit 50 uses the weight vectors calculated in the third timeslot to weight the transmission signal for the mobile station c and outputs the four resulting signals to the radio units 11 to 41.

As another example, four signals corresponding to a mixture of signals transmitted by the mobile station a and the mobile station b are inputted into the signal processing unit 50 in the second timeslot. The signal processing unit 50 calculates optimal weight vectors separately for the mobile station a and the mobile station b, and uses these weight vectors to weight the signals corresponding to the payloads that are inputted next. The signal processing unit 50 combines these weighted signals to obtain separate combined signals for the mobile station a and the mobile station b, and outputs these combined signals to the modem unit 60. In the sixth timeslot, when separate transmission signals for the mobile station a and the mobile station b are inputted, the signal processing unit 50 uses the weight vectors calculated in the second timeslot to weight the transmission signals for the mobile stations a and b, multiplexes these weighted signals for each radio unit, and outputs the multiplexed signals to the radio units 11 to 41.

In the upstream timeslots where spatial multiplexing is performed, the signal processing unit 50 calculates a response vectors for each mobile station from (1) the signals inputted from each radio unit 11 to 41 and (2) the combined signals for each mobile station, and stores the response vectors in an internal memory. In the example shown in FIG. 2, spatial multiplexing is performed in the second timeslot, so that the signal processing unit 50 calculates response vectors for each of the mobile station a and the mobile station b from the four signals inputted from the radio units 11 to 41 in the second timeslot and the combined signals corresponding to the mobile stations a and b, and stores these response vectors in the internal memory. The term "response vector" refers to information relating to the direction in which a signal was received from a mobile station. The internal memory stores a response vector for each mobile station and has its stored content every time a response vector is newly calculated.

On being informed of the detection of a reception error by the control unit 80, the signal processing unit 50 calculates a special weight vector for the mobile station for which the reception error was detected using a calculation method that differs from the method normally used to calculate weight vectors. The signal processing unit 50 thereafter uses this special weight vector to weight the transmission signal for this mobile station.

This special weight vector is called a "forced null weight vector". Forced null weight vectors are calculated using the response vectors for the mobile stations aside from the mobile station for which the reception error occurred. A directivity pattern formed using this forced null weight vector characteristically has a null directivity for each mobile station aside from the mobile station for which the reception error occurred. As a result, when receiving signals from the wireless base station 100, mobile stations aside from the mobile station for which the reception error occurred will not suffer from interference due to a signal for the mobile station for which the reception error occurred. Reception by such mobile stations is therefore unhindered.

Modem Unit 60

The modem unit 60 is provided between the signal processing unit 50 and the baseband unit 70, and modulates and demodulates signals that are spatial multiplexed in each timeslot using an π/4-shift QPSK method.

Baseband Unit 70

The baseband unit 70 has a separate TDMA/TDD processing unit for each signal that can be spatial multiplexed, meaning that the baseband unit 70 has four of such units in the present embodiment. Whenever spatial multiplexing is performed, the baseband unit 70 separates and composes a TDMA/TDD frame for the signals transferred between a plurality of signal lines connected via a telephone exchange and the modem unit 60.

The baseband unit 70 also informs the control unit 80 of various types of error when they occur. In more detail, when separating the TDMA/TDD frames for a signal inputted from the modem unit 60, the baseband unit 70 detects the synch word that is present in the signal for synchronizing each frame. The baseband unit 70 compares a synch word that is stored in advance with parts of the signal that roughly correspond to where the synch word should be and detects the synch word if one of these parts matches the stored synch word. Here, the data is said to match even if the value of one bit is different. On failing to detect the synch word, the baseband unit 70 informs the control unit 80 that the synch word could not be detected.

When separating TDMA/TDD frames for the signal outputted by the modem unit 60, the baseband unit 70 also detects whether there is a CRC (Cyclic Redundancy Check) error based on a CRC signal that is attached to the end of the payload. On detecting a CRC error, the baseband unit 70 informs the control unit 80 of the CRC error.

Control Unit 80

The control unit 80 performs the usual communication control processes found in a conventional wireless base station and additionally monitors whether notification of a CRC error or of a failure to detect the synch word has been received from the baseband unit 70. When such a notification has been received, the control unit 80 instructs the signal processing unit 50 to calculate a forced null weight vector for the mobile station for which the error occurred and to weight the transmission signal for this mobile station using the calculated forced null weight vector.

Detailed Construction of the Signal Processing Unit 50

The following describes the construction of the signal processing unit 50 in detail.

The signal processing unit 50 includes a signal adjusting unit 51, a forced null weight calculating unit 52, a response vector calculating unit 53, and an RSSI detecting unit 54. The signal processing unit 50 is actually realized by a DSP (Digital Signal Processor), and the processes performed by the individual components of the signal processing unit 50 are achieved by programs.

Signal Adjusting Unit 51

The signal adjusting unit 51 calculates the weight vectors and weights signals using these weight vectors.

The following describes the notation used for the various signals. The signals inputted into the signal adjusting unit 51 by the radio units 11 to 41 in each of the upstream timeslots are numbered X1, X2, X3, and X4.

The weight vectors corresponding to the mobile stations a, b, c, and d are numbered Wa, Wb, Wc, and Wd, the combined signals corresponding to the mobile stations a, b, c, and d are numbered URa, URb, URc, and URd, and the transmission signals corresponding to the mobile stations a, b, c, and d are numbered UTa, UTb, UTc, and UTd. The weight vector Wa is composed of the parameter set Wa1, Wa2, Wa3, and Wa4. Likewise, the weight vectors Wb, Wc, and Wd are composed of the parameter sets: Wb1, Wb2, Wb3, and Wb4; Wc1, Wc2, Wc3, and Wc4; and Wd1, Wd2, Wd3, and Wd4, respectively. The signals obtained by weighting the transmission signal UTa using the weight vector Wa are numbered Sa1, Sa2, Sa3, and Sa4. In the same way, the obtained by weighting the transmission signal UTb using the weight vector Wb are numbered Sb1, Sb2, Sb3, and Sb4, the signals obtained by weighting,the transmission signal UTc using the weight vector Wc are numbered Sc1, Sc2, Sc3, and Sc4, and the signals obtained by weighting the transmission signal UTd using the weight vector Wd are numbered Sd1, Sd2, Sd3, and Sd4. The signals that are produced by multiplexing the above signals in the downstream timeslots and are outputted to the radio units 11 to 41 by the signal adjusting unit 51 are numbered S1, S2, S3, and S4.

Detailed Construction of the Signal Adjusting Unit 51

Figure 6:
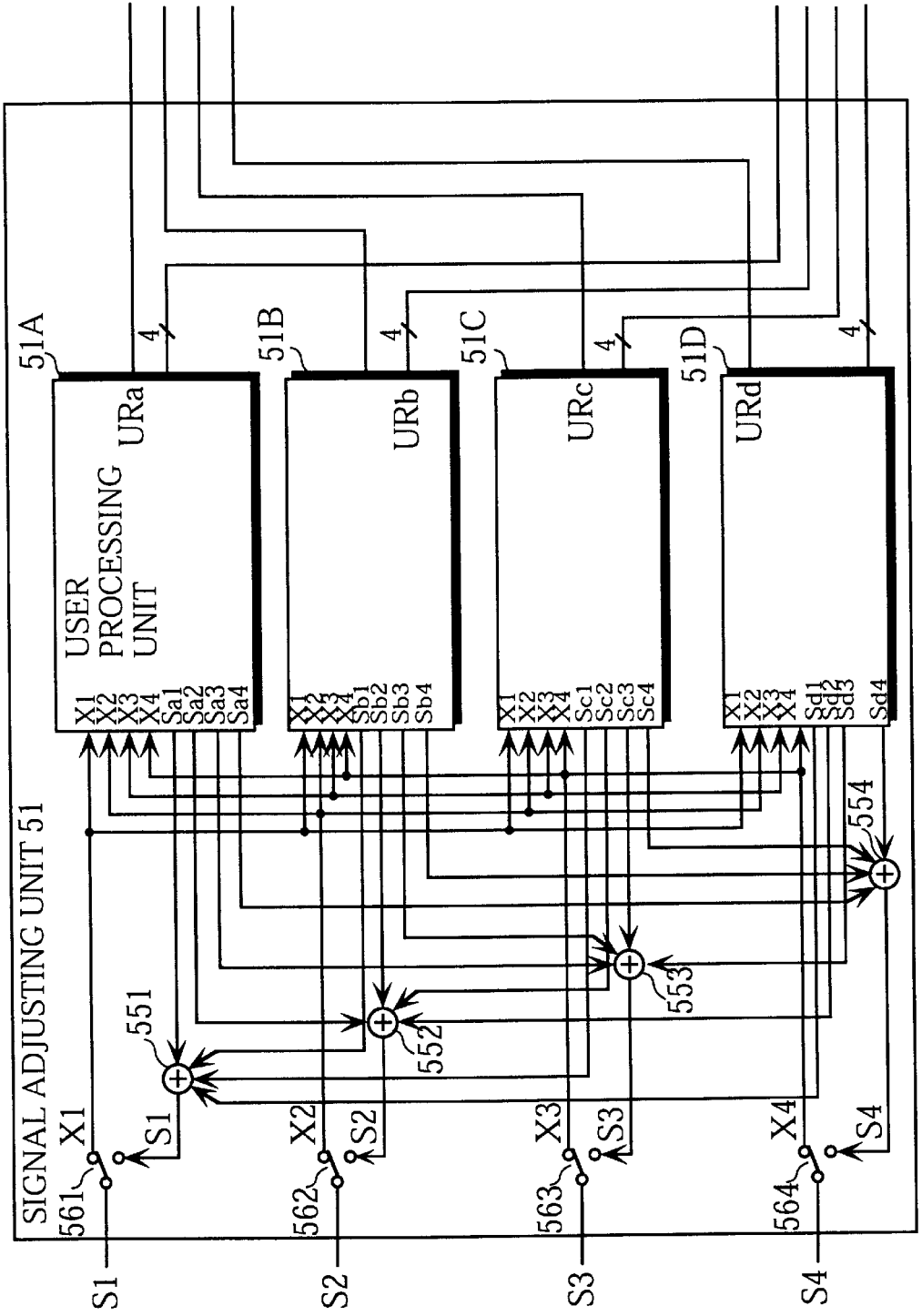
FIG. 6 shows the construction of the signal adjusting unit 51 in detail.

FIG. 6 shows the composition of the signal adjusting unit 51 in detail.

As shown in FIG. 6, the signal adjusting unit 51 includes user processing units 51A to 51D, adders 551 to 554, and switches 561 to 564 that switch according to whether transmission or reception is being performed within a TDMA/TDD frame.

User Processing Units 51A to 51D

The user processing units 51A to 51D each correspond to one mobile station in one timeslot, and each calculate weight vectors and weight signals using the calculated weight vectors. FIG. 7 shows an example of the user processing units 51A to 51D correspond to the mobile stations a to d. As shown in FIG. 7, the user processing unit 51A corresponds to the mobile station a in the second and sixth timeslots, while the user processing unit 51B corresponds to the mobile station b in the second and sixth timeslots. The user processing unit 51C corresponds to the mobile station c in the third and seventh timeslots, while the user processing unit 51D corresponds to the mobile station d in the fourth and eighth timeslots. The correspondence between user processing units and mobile stations is managed by the control unit 80.

Detailed Construction of the User Processing Units 51A to 51D

Figure 8:
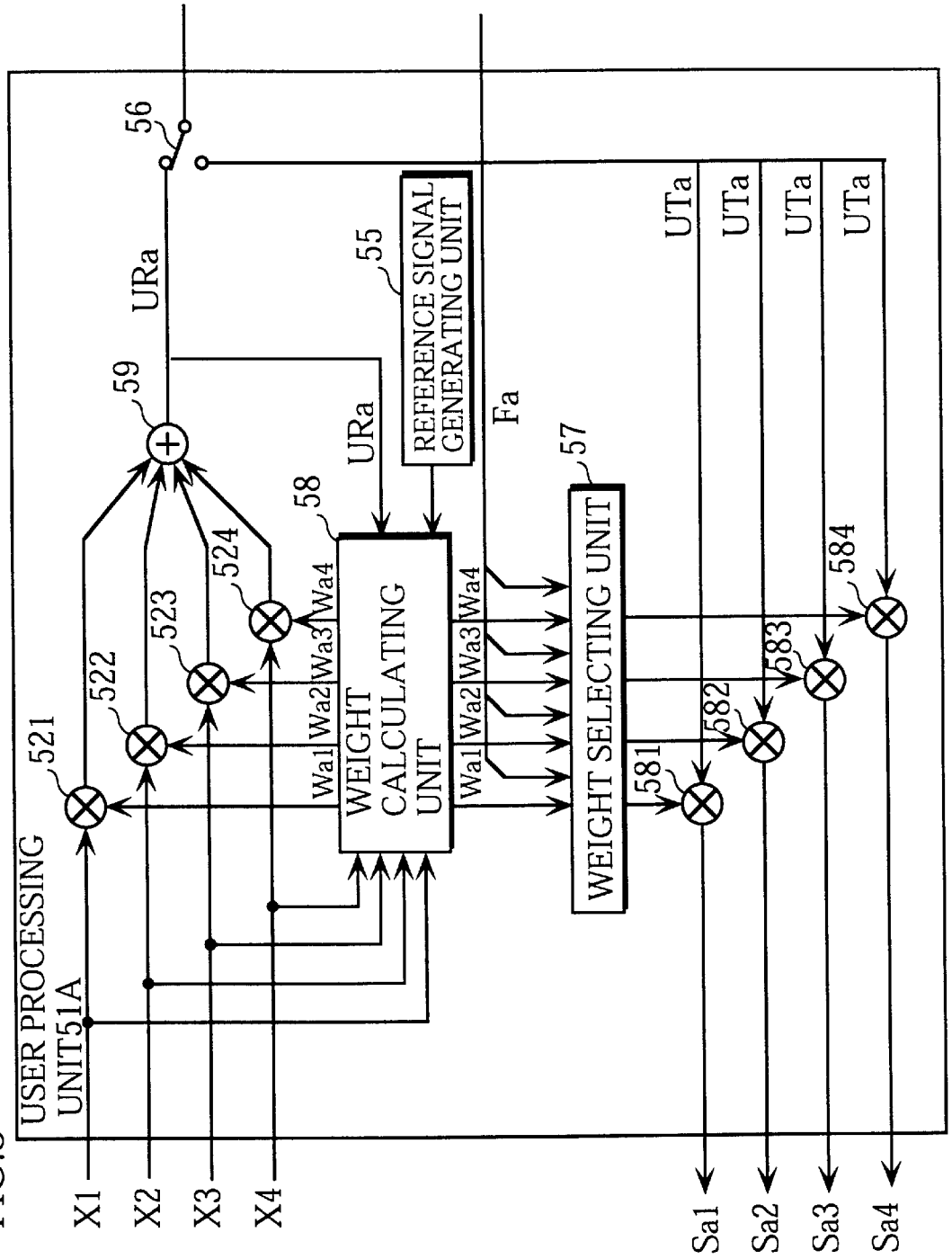
FIG. 8 shows the construction of the user processing unit 51A in detail.

FIG. 8 shows the construction of the user processing unit 51A in detail.

As shown in FIG. 8, the user processing unit 51A includes multipliers 521 to 524, multipliers 581 to 584, a weight calculating unit 58, a reference signal generating unit 55, an adder 59, a switch 56, and a weight selecting unit 57. The following describes the processing of the various components of the user processing unit 51A for the case where the user processing unit 51A corresponds to mobile station a.

In an upstream timeslot, the weight calculating unit 58 outputs the parameter set Wa1, Wa2, Wa3, and Wa4 for the weight vector Wa to the multipliers 521 to 524 while the predetermined signals are being received from the mobile station a.

As a result, the signal URa, which has been produced from the signals X1 to X4 inputted from the radio units 11 to 41 and the parameter set Wa1, Wa2, Wa3, and Wa4 by the weighting and combining performed by the multipliers 521 to 524 and the adder 59, is fed back into the weight calculating unit 58. The weight calculating unit 58 repeatedly performs an operation where it (1) adjusts the weight vector Wa so as to minimize the difference between the signal URa and the reference signal d generated by the reference signal generating unit 55 and (2) outputs the resulting weight vector Wa to the multipliers 581 to 584. In this way, the weight calculating unit 58 obtains the optimal weight vector Wa.

The reference signal d is produced by converting the bit pattern of the predetermined signal included in a signal received from a mobile station into symbol data for comparison purpose. Under PHS (Personal Handyphone System) standard, for example, the signals received in an upstream timeslot include predetermined bit patterns for the R (Ramp bits), SS (Start Symbol), PR (Preamble), and UW (Unique Word) fields. These can be used as the reference signal. The calculation of the weight vectors is well known, and so is not described in any more detail.

When operating as part of the system that receives the payload part of the signal transmitted by the mobile station a, the weight calculating unit 58 outputs the calculated weight vector Wa to the multipliers 521 to 524.

In the downstream timeslots, the weight calculating unit 58 outputs the weight vector Wa it calculated in the corresponding upstream timeslot in the same frame to the weight selecting unit 57. If reception was performed normally in the corresponding upstream timeslot, the weight vector Wa that was outputted to the weight selecting unit 57 is outputted as it is to the multipliers 581 to 584.

While the predetermined signal is being received from the mobile station a, the reference signal generating unit 55 outputs symbol data, which is the reference signal, to the weight calculating unit 58 in accordance with the symbol timing.

In the upstream timeslot, the multipliers 521 to 524 and the adder 59 weight the signals X1 to X4 received from the radio units 11 to 41 using the weight vector Wa outputted by the weight calculating unit 58 and combine the results to produce the signal URa that is outputted.

In the downstream timeslots, the signal UTa for the mobile station a is inputted by the modem unit 60 into the multipliers 581 to 584, which weight the signal UTa using the weight vector Wa outputted by the weight selecting unit 57 and output the signals Sa1 to Sa4.

Weight Selecting Unit 57

When there is a reception error in an upstream timeslot, the weight selecting unit 57 operates as follows in the corresponding downstream timeslot. Instead of the weight vector inputted from the weight calculating unit 58, the weight selecting unit 57 selects the forced null weight vector Fa that is inputted from the forced null weight calculating unit 52 and outputs the forced null weight vector Fa to the multipliers 581 to 584.

The forced null weight vector Fa referred to here is composed of a parameter set Fa1, Fa2, Fa3, and Fa4. When no reception error occurs, the weight selecting unit 57 selects the weight vector Wa inputted from the weight calculating unit 58 and outputs the weight vector Wa to the multipliers 581 to 584. The weight selecting unit 57 changes the selection in accordance with an instruction received from the control unit 80 that detects the reception error.

The user processing units 51B to 51D each have the same construction as the user processing unit 51A and so will not be explained.

FIGS. 9A, 9B, and 9C show the inputs into the user processing units 51A to 51D, the processing performed, and the outputs in upstream and downstream timeslots.

FIG. 9A shows the signals inputted into the user processing units 51A to 51D in upstream and downstream timeslots.

As shown in FIG. 9A, in the upstream timeslots the user processing units 51A to 51D receive an input of the signals X1, X2, X3, and X4 from the radio units 11 to 41. In the downstream timeslots, the user processing units 51A to 51D receive an input of the signals UTa, UTb, UTc, and UTd corresponding to the mobile stations a, b, c, and d.

FIG. 9B shows the processing content of the user processing units 51A to 51D in the upstream and downstream timeslots.

As shown in FIG. 9B, the user processing units 51a to 51D calculate the weight vectors Wa, Wb, Wc, and Wd for the mobile stations in the upstream timeslots and use these weight vectors to weight and combine the signals X1, X2, X3, and X4. In the downstream timeslots, the user processing units 51a to 51d weight the signals UTa, UTb, UTc, and UTd for the mobile stations using the weight vectors Wa, Wb, Wc, and Wd used in the upstream timeslots.

FIG. 9C shows the signals outputted by the user processing units 51A to 51D in the upstream and downstream timeslots.

As shown in FIG. 9C, the user processing units 51A to 51D output the combined signals URa to URd for each mobile station in the upstream timeslots. In the downstream timeslots, the user processing units 51A to 51D output the distributed signals Sa1 to Sa4, Sb1 to Sb4, Sc1 to Sc4, and Sd1 to Sd4 for each mobile station to the antennas.

Adders 551 to 554

The adders 551 to 554 add the distributed signals Sa1 to Sa4, Sb1 to Sb4, Sc1 to Sc4, and Sd1 to Sd4 for each mobile station in each downstream timeslot to multiplex these signals and so produce the signals S1 to S4 that are outputted to the four antennas.

FIG. 10 shows the inputs and outputs of the signal adjusting unit 51 in upstream and downstream timeslots.

As shown in FIG. 10, in the upstream timeslots, the signal adjusting unit 51 receives an input of the signals X1 to X4 that correspond to the four antennas and outputs the signals URa to URd for each mobile station. In the downstream timeslots, the signal adjusting unit 51 receives an input of the signals UTa to UTd for each mobile station and outputs the signals S1 to S4 to the corresponding antennas.

Response Vector Calculating Unit 53

In the upstream timeslots, the response vector calculating unit 53 calculates and stores response vectors Ra to Rd corresponding to the mobile stations a to d. When a reception error occurs in an upstream timeslot, the response vector calculating unit 53 outputs the response vectors to the forced null weight calculating unit 52 in accordance with instructions from the control unit 80.

In the upstream timeslots, the response vector calculating unit 53 calculates the response vectors Ra to Rd in the upstream timeslots for each user processing unit (i.e., for each mobile station) from the signals X1 to X4 and the combined signals URa to URd. The response vector calculating unit 53 stores these response vectors Ra to Rd in a response vector memory 531 with which it is equipped. One example of the stored content of the response vector memory 531 is shown in FIG. 11A.

The response vector calculating unit 53 updates the content of the response vector memory 531 in every frame. FIG. 11B shows the stored content of the response vector memory 531 in each upstream timeslot of the frames (T1), (T2), and (T3).

The legends Ra(T1) to Rd(T1) given in the frame (T1) represent the response vectors that are calculated in the frame (T1). After frame (T1), the response vector calculating unit 53 calculates response vectors Ra(T2) to Rd (T2) in the frame (T2) and updates the content of the response vector memory 531. In this way, the response vector calculating unit 53 calculates appropriate response vectors for the current conditions and stores them in the response vector memory 531.

When there is a reception error and the response vector calculating unit 53 cannot obtain the signals X1 to X4 or the combined signals URa to URd, the response vector calculating unit 53 will not be able to calculate one or more response vectors for the current frame. In this case, the response vector memory 531 will continue to store the corresponding response vectors for the preceding frame. As one example, when there is a reception error in the second timeslot of the frame (T3) in FIG. 11B, the response vector calculating unit 53 cannot obtain the signals X1 to X4 or the combined signals URa to URd and so cannot calculate the response vector Ra(T3).

As a result, the response vector calculating unit 53 has the response vector memory 531 continue to store the response vector Ra(T2) for the preceding frame (T2).

Note that the response vector calculating unit 53 receives indications from the control unit 80 showing the timing for calculating the response vectors.

Calculation of Response Vectors

The following describes the calculation of response vectors by the response vector calculating unit 53 in detail.

The signals transmitted by the mobile station a, the mobile station b, the mobile station c, and the mobile station are set as Pa'(t), Pb'(t), Pc'(t), and Pd'(t), and the signals inputted into the signal processing unit 50 via the antennas 10 to 40 (also referred to as the first to fourth antennas) and the reception units 11 to 41 are set as X1(t), X2(t), X3(t), and X4(t). Also, "hij" is a complex number representing the propagation path from the mobile station j to the $i^{th}$ antenna.

In this case, the following relationship is established between Pa'(t) to Pd'(t) and X1(t) to X4(t).

$$X1(t)=h1a \cdot Pa'(t)+h1b \cdot Pb'(t)+h1c \cdot Pc'(t)+h1d \cdot Pd'(t)+n1(t)$$

$$X2(t)=h2a \cdot Pa'(t)+h2b \cdot Pb'(t)+h2c \cdot Pc'(t)+h2d \cdot Pd'(t)+n2(t)$$

$$X3(t)=h3a \cdot Pa'(t)+h3b \cdot Pb'(t)+h3c \cdot Pc'(t)+h3d \cdot Pd'(t)+n3(t)$$

$$X4(t)=h4a \cdot Pa'(t)+h4b \cdot Pb'(t)+h4c \cdot Pc'(t)+h4d \cdot Pd'(t)+n4(t) \quad \text{Expression 1}$$

Note that n1(t), n2(t), n3(t), and n4(t) represent noise. Also, the combined signal URa(t) obtained by the signal adjusting unit 51 and the signal Pa'(t) transmitted by the mobile station a will be the same when the transmitted signal has been properly received and the signal has been extracted properly.

The response vector calculating unit 53 uses URa*(t), which is the complex conjugate of the extracted signal URa(t), and signals X1(t), X2(t), X3(t), and X4(t) to calculate the components h1a, h2a, h3a, and h4a of the response vector Ha for the mobile station a from the following expression.

$$h1a=E[X1(t)URa^*(t)]$$

$$h2a=E[X2(t)URa^*(t)]$$

$$h3a=E[X3(t)URa^*(t)]$$

$$h4a=E[X4(t)URa^*(t)] \quad \text{Expression 2}$$

In the above expressions, the notation E[ ] represents an ensembled average, meaning an average taken over a period where t=1, 2, . . . , n. When n is assumed to be 100, for example, an average is calculated for 100 symbol periods.

When the extracted signals URa(t), URb(t), URc(t), and URd(t) are obtained properly and are regarded as being equal to the transmitted signals Pa'(t), Pb'(t), Pc'(t), and Pd'(t), Pa'(t), Pb'(t), Pc'(t), and Pd'(t) can be replaced with URa(t), URb(t), URc(t), and URd(t) in Expression 1. Multiplying both sides by URa*(t) and finding the ensembled average gives Expression 3 below.

$$E[X1(t) \cdot URa^*(t)]=E[h1a \cdot URa(t) \cdot URa^*(t)]+E[h1b \cdot URb(t) \cdot URa^*(t)]+E[h1c \cdot URc(t) \cdot URa^*(t)]+E[h1d \cdot URd(t) \cdot URa^*(t)]+E[n1(t) \cdot URa^*(t)]$$

$$E[X2(t) \cdot URa^*(t)]=E[h2a \cdot URa(t) \cdot URa^*(t)]+E[h2b \cdot URb(t) \cdot URa^*(t)]+E[h2c \cdot URc(t) \cdot URa^*(t)]+E[h2d \cdot URd(t) \cdot URa^*(t)]+E[n2(t) \cdot URa^*(t)]$$

$$E[X3(t) \cdot URa^*(t)]=E[h3a \cdot URa(t) \cdot URa^*(t)]+E[h3b \cdot URb(t) \cdot URa^*(t)]+E[h3c \cdot URc(t) \cdot URa^*(t)]+E[h3d \cdot URd(t) \cdot URa^*(t)]+E[n3(t) \cdot URa^*(t)]$$

$$E[X4(t) \cdot URa^*(t)]=E[h4a \cdot URa(t) \cdot URa^*(t)]+E[h4b \cdot Urb(t) \cdot URa^*(t)]+E[h4c \cdot URc(t) \cdot URa^*(t)]+E[h4d-URd(t) \cdot URa^*(t)]+E[n4(t) \cdot URa^*(t)] \quad \text{Expression 3}$$

Here E[URa(t)·URa*(t)]=1 and there are fundamentally no correlation between the signals Pa'(t), Pb'(t), Pc'(t), Pd'(t) transmitted from the mobile stations, nor any correlation between the signal Pa'(t) and the noise components n1(t) to n4(t) As a result, E[URB(t)·URa*(t)]=0, E[URc(t)·URa*(t)]=0, E[URd(t)·URa*(t)]=0, E[n1(t)·URa*(t)]=0, E[n2(t)·URa(t)]=0, E[n3(t)·URa*(t)]=0, and E[n4(t)·URa*(t)]=0.

As a result, Expression 2 can be derived from Expression 3. This removes the effects of noise from the calculations.

The response vector calculating unit 53 performs the calculations shown in FIG. 2 and so finds the response vector Hj=(h1j,h2j,h3j,h4j) for the mobile station j.

Forced Null Weight Calculating Unit 52

When instructed to calculate forced null weight vector by the control unit 80 on account of a reception error having occurred for one mobile station in a spatial multiplexed timeslot, the forced null weight calculating unit 52 uses the response vectors for the corresponding reception timeslot to calculate a forced null weight vector and outputs the calculated forced null weight vector to the user processing unit that corresponds to the mobile station for which the reception error occurred.

Assume that a reception error has occurred for mobile station a in the second timeslot shown in FIG. 2, for example. In this case, the forced null weight calculating unit 52 is instructed by the control unit 80 to calculate a forced null weight vector for output to the user processing unit 51a in the second timeslot.

After being instructed in this way, the forced null weight calculating unit 52 receives the response vectors for the second timeslot from the response vector calculating unit 53. In this case, the response vectors Ra and Rb for the mobile stations a and b are received.

As shown in FIG. 11B, the response vector Rb is the response vector for the present frame, but the response vector Rb is the response vector for the preceding frame. The forced null weight calculating unit 52 calculates the forced null weight vector Fa from the response vectors Ra and Rb, and outputs the calculated forced null weight vector Fa in the sixth timeslot that is the downstream timeslot corresponding to the second timeslot.

Calculation of a Forced Null Weight Vector

The following describes the calculation of a forced null weight vector by the forced null weight calculating unit 52 in detail.

Each forced null weight vector Fa for the mobile station a is defined as shown below.

$$Fa = (f1a, f2a, f3a, f4a)\ T \text{ (where } T \text{ means transposition)} \quad \text{Expression 4}$$

The calculation performed by the signal adjusting unit 51 to obtain the combined signal URa from the signals X1 to X4 and the forced null weight vector Fa is given below as Expression 5.

$$URa = f1a \cdot X1 + f2a \cdot X2 + f3a \cdot X3 + f4a \cdot X4 \quad \text{Expression 5.}$$

For the combined signal URa for the mobile station a, this can be expanded using the definition of the response vectors given above to produce Expression 6 below.

Expression 6

$$URa = f1a(h1a \cdot Pa' + h1b \cdot Pb' + h1c \cdot Pc' + h1d \cdot Pd') +$$
$$f2a(h2a \cdot Pa' + h2b \cdot Pb' + h2c \cdot Pc' + h2d \cdot Pd') +$$
$$f3a(h3a \cdot Pa' + h3b \cdot Pb' + h3c \cdot Pc' + h3d \cdot Pd') +$$
$$f4a(h4a \cdot Pa' + h4b \cdot Pb' + h4c \cdot Pc' + h4d \cdot Pd') =$$
$$(f1a \cdot h1a + f2a \cdot h2a + f3a \cdot h3a + f4a \cdot h4a)Pa' +$$
$$(f1a \cdot h1b + f2a \cdot h2b + f3a \cdot h3b + f4a \cdot h4b)Pb' +$$

-continued
$$(f1a \cdot h1c + f2a \cdot h2c + f3a \cdot h3c + f4a \cdot h4c)Pc' +$$
$$(f1a \cdot h1d + f2a \cdot h2d + f3a \cdot h3d + f4a \cdot h4d)Pd'$$

Expression 7 below shows the case where the combined signal URa is equal to the signal Pa' transmitted from the mobile station a, which is to say, the case where the signal Pa' is received in ideal conditions.

$$f1a \cdot h1a + f2a \cdot h2a + f3a \cdot h3a + f4a \cdot h4a = 1$$
$$f1a \cdot h1b + f2a \cdot h2b + f3a \cdot h3b + f4a \cdot h4b = 0$$
$$f1a \cdot h1c + f2a \cdot h2c + f3a \cdot h3c + f4a \cdot h4c = 0$$
$$f1a \cdot h1d + f2a \cdot h2d + f3a \cdot h3d + f4a \cdot h4d = 0 \quad \text{Expression 7}$$

In Expression 7, (h1a,h2a,h3a,h4a) can be replaced with the response vector for the mobile station a for the preceding frame, while (h1b,h2b,h3b,h4b), (h1c,h2c,h3c,h4c) and (h1d,h2d,h3d,h4d) can be replaced with the response vectors for the mobile stations b, c, and d from the present frame. In this way, a forced null weight vector Fa=(f1a,f2a,f3a,f4a) that has directivity for the mobile station a but null directivity for the mobile stations b, c, and d can be found. Note that it is preferable to find the forced null weight vector Fa using a method that uses the weight vectors from immediately before the reception error occurred to make adjustments so that the above conditions are satisfied.

The same calculations can be used as necessary for mobile stations b, c, and d to find the forced null weight vectors Fb, Fc, and Fd from the response vectors.

RSSI Detecting Unit 54

The RSSI detecting unit 54 detects the RSSI (Received Signal Strength Indicator) of each slot and outputs the detected values to the control unit 80.

Construction of the Control Unit 80

The control unit 80 is composed of an error detecting unit 81 and a forced null indicating unit 82.

The error detecting unit 81 detects whether a notification of a failure to detect a synch word or a notification of the occurrence of a reception error has been received from the baseband unit 70. The error detecting unit 81 informs the forced null indicating unit 82 of the notification it has detected.

On being informed of a reception error due to a failure to detect a synch word, the error detecting unit 81 determines whether synchronization has been lost. In more detail, the error detecting unit 81 determines whether the baseband unit 70 has reported the occurrence of reception errors due the failure to detect a synch word for a predetermined number of consecutive frames.

Note that when the error detecting unit 81 determines that synchronization has been lost, the control unit 80 performs a procedure where a synch burst signal for establishing synchronization is repeatedly transmitted to the mobile station for which the reception error occurred.

The control unit 80 repeatedly transmits the synch burst signal until the mobile station sends back a synch burst signal in response to the synch burst signal received from the wireless base station 100. If no response is received within 15 seconds, the control unit 80 stops transmitting the synch burst signal.

On being informed of the detection of a reception error by the error detecting unit 81, the forced null indicating unit 82 performs a forced null control procedure. In more detail, the forced null indicating unit 82 has the response vector calculating unit 53 output the response vectors for the upstream timeslot in which the reception error occurred to the forced null weight calculating unit 52, has the forced null weight calculating unit 52 calculate a forced null weight vector for the mobile station which the reception error occurred during the upstream timeslot and output the calculated forced null weight vector to the corresponding user processing unit, and has the weight selecting unit 57 of this user processing unit select the forced null weight vector.

The forced null indicating unit 82 performs a different forced null control procedure depending on whether the detected reception error is due to a loss of synchronization.

When synchronization has been lost, the forced null indicating unit 82 repeatedly performs the forced null control procedure for the mobile station in question while the procedure for repeatedly transmitting a synch burst signal is being performed.

As a result, while the synch burst signal is being transmitted, forced null weight vectors for the mobile station in question are calculated within in the signal adjusting unit 51 from the response vector for the mobile station from before the synch burst signals were transmitted and the response vectors of the other mobile stations with signals that are spatial multiplexed with the signal for the present mobile station. These forced null weight vectors are used when transmitting the synch burst signal the mobile station.

As a result, while the synch burst signal is being transmitted, the null points of the directivity pattern formed when transmitting the synch burst signal are directed towards the other mobile stations with signals that are multiplexed with the signal of the mobile station for which the reception error has occurred. This means that the synch problem can be solved without interfering with the transfer of signals by other mobile stations.

When it has been determined that the reception error is due to synchronization having been lost, the forced null indicating unit 82 may control the four radio units 11 to 41 to raise the transmission power while the synch burst signal is being transmitted, in addition to repeatedly performing the forced null control procedure for the mobile station.

As a result, the directivity pattern for the synch burst signal that is formed using the forced null weight vector will have a higher transmission power, raising the probability of the transmission burst signal reaching a mobile station that has lost synchronization. This in turn raises the probability of the mobile station being able to reestablish synchronization with the wireless base station 100.

When it is determined that the reception error is not due to a loss of synchronization, the forced null indicating unit 82 performs the forced null control procedure only in the frames in which a reception error has occurred.

Operation

The following describes the operation of the wireless base station 100.

Figure 12:
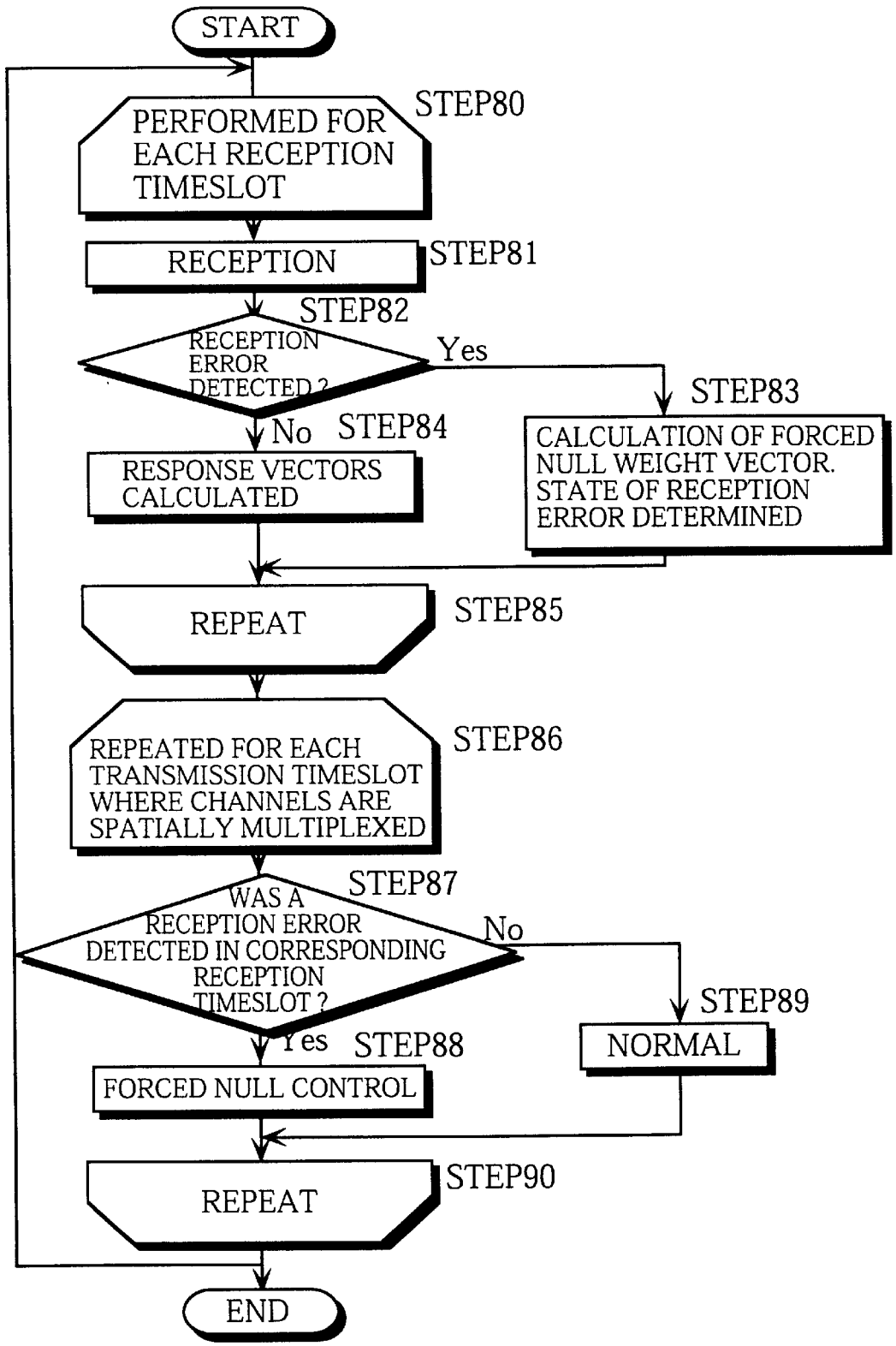
FIG. 12 is a flowchart showing the operational procedure performed by the wireless base station 100.

FIG. 12 is a flowchart showing the operational procedure used by the wireless base station 100.

The wireless base station 100 repeats the processing shown in steps 80 to 90 in each frame.

First, the wireless base station 100 repeats the processing shown in steps 80 to 85 for each upstream timeslot.

In each upstream timeslot, the wireless base station 100 receives a signal from a mobile station (step 81). When the error detecting unit 81 does not detect an error (step 82:No), the response vector calculating unit 53 calculates the response vectors for this upstream timeslot and stores them in the response vector memory 531.

The response vector calculating unit 53 calculates response vectors for the mobile stations for which no reception error occurred and stores the calculated response vectors in the response vector memory 531 (step 83). Also in step 83, when an error was detected in step 82, the error detecting unit 81 determines whether the reception error is due to a loss of synchronization, and the forced null indicating unit 82 has the forced null weight calculating unit 52 calculate a forced null weight vector.

The response vector calculating unit 53 calculates response vectors for the mobile station for which no reception error occurred and stores the calculated response vectors in the response vector memory 531.

Following this, the wireless base station 100 repeats the processing in steps 86 to 90 in each downstream timeslot.

In each downstream timeslot, if no reception error was detected in the corresponding upstream timeslot (step 87:No), the signal adjusting unit 51 performs the standard procedure (step 88). In this case, the signal adjusting unit 51 weights the transmission signals using the weight vectors that were used in the upstream timeslots. When a reception error is detected in an upstream timeslot (step 87:Yes), the forced null indicating unit 82 performs forced null control whose content depends on whether the detected reception error is a due to a loss of synchronization or not (step 88).

Figure 3:
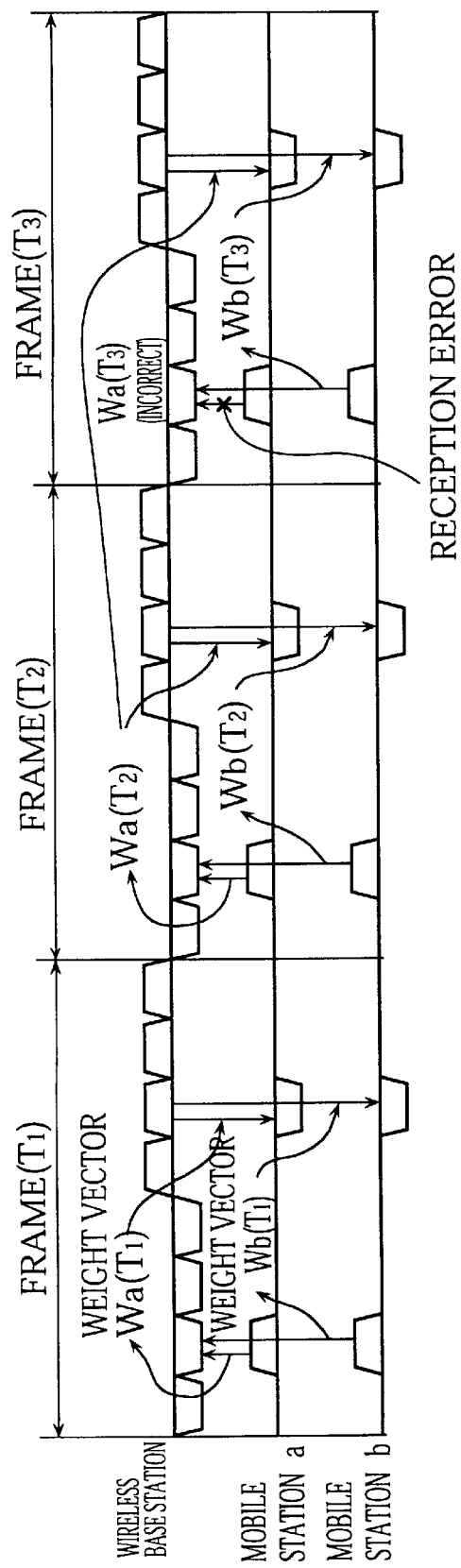
Figure 4:
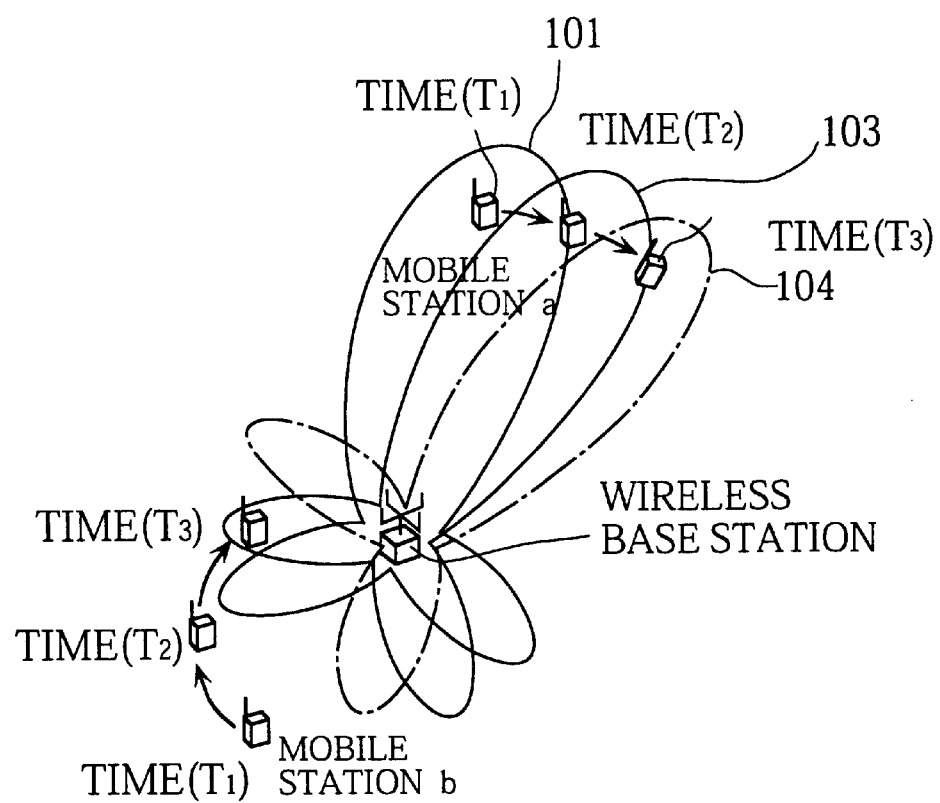
FIG. 4 corresponds to FIG. 1B, and shows the formation of directivity patterns by a wireless base station that communicates with mobile stations a and b using spatial multiplexing for the case when a reception error has occurred for the mobile station a at time T3.
Figure 13:
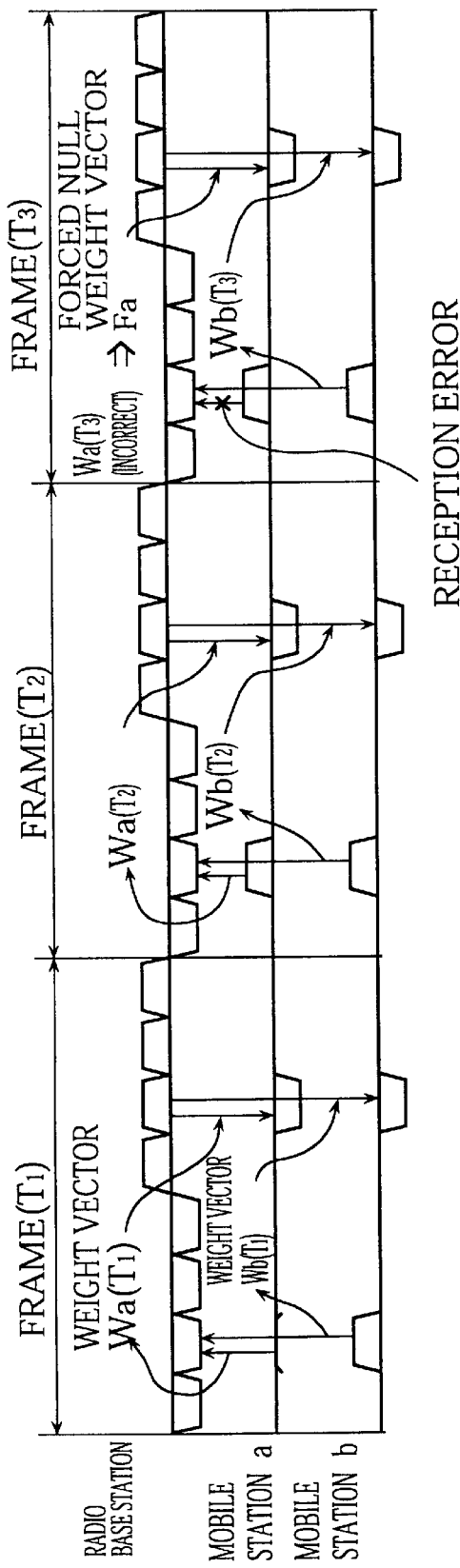

FIG. 13 shows one example of the forced null control performed by the wireless base station 100 when a reception error occurs for the mobile station a as shown in FIG. 3.

As shown in FIG. 3, the wireless base station 100 performs spatial multiplexing to communicate with the mobile stations a and b in the second and sixth timeslots of the frames (T1), (T2), and (T3).

In frames (T1) and (T2), the wireless base station 100 calculates the weight vectors Wa(T1), Wb(T1) and Wa(T2), Wb(T2) and uses these to weight the signals for the mobile stations a and b as per normal. Following this, in frame (T3), a reception error occurs for the mobile station a, so that the wireless base station 100 cannot calculate the weight vector Wa(T3).

At this point, the forced null indicating unit 82 of the control unit 80 instructs the signal processing unit 50 to calculate the forced null weight vector Fa. On being instructed by the forced null indicating unit 82 to select the forced null weight vector Fa, the user processing unit 51A uses the forced null weight vector Fa to weight the signal for the mobile station a and has this signal transmits the signal in the downstream timeslot.

By operating in this way, when a reception error is detected for the mobile station a, the wireless base station 100 uses the forced null weight vector Fa calculated for the mobile station a to form a directivity pattern for the mobile station a when communicating with this mobile station. This directivity-pattern has a null point for the mobile station b, so that communication between the wireless base station 100 and the mobile station b is not affected by the directivity pattern for the mobile station a. Communication between the wireless base station 100 and the mobile station b can therefore proceed as normal.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A method in a wireless base station that uses time-division duplexing and communicates with a plurality of mobile stations, the wireless base station repeatedly executing a cycle including a reception period and a transmission period, the method comprising the steps of:

calculating, during the reception period, a first weight vector for each of the plurality of mobile stations and obtaining transmission signals transmitted by the plurality of mobile stations by weighting signals received by a plurality of antennas using the calculated first weight vectors for the mobile stations;

transmitting signals, during the transmission period, which have been weighted using the first weight vectors corresponding to the mobile stations, to the plurality of mobile stations via the plurality of antennas;

calculating, from current response vectors of other mobile stations, a second weight vector that has null directivity for the other mobile stations, when the wireless base station detects an error in a signal obtained from an arbitrary mobile station during the reception period in a cycle; and weighting a signal transmitted to the arbitrary mobile station using the second weight vector instead of using the first weight vector and transmitting the weighted signal via the plurality of antennas when the error is detected during the transmission period in the same cycle as the reception period.

2. A wireless base station that uses a time-division duplexing and communicates with a plurality of mobile stations, the wireless base station repeatedly executing a cycle composed of a reception period where signals are received from the mobile stations and a transmission period where signals are transmitted to the mobile stations, the wireless base station comprising:

reception means for calculating, during the reception period in a cycle, a first weight vector for each of the plurality of mobile stations, and for weighting signals received via a plurality of antennas using the calculated first weight vectors to obtain a received signal for each of the mobile stations;

transmission means for transmitting, during the transmission period in a cycle, signals to each mobile station via the plurality of antennas, the signal transmitted to each mobile station having been weighted using the first weight vector corresponding to the mobile station; and detection means for detecting, during the reception period in a cycle, whether an error has occurred in a signal obtained for any of the mobile stations, wherein when the detection means detects an error in a signal obtained for an arbitrary mobile station, the transmission means calculates a second weight vector for the arbitrary mobile station based on current response vectors for other mobile stations and uses the calculated second weight vector in place of the first weight vector to weight the signal transmitted to the arbitrary mobile station in the transmission period in a same cycle as the reception period in which the error occurred.

3. A wireless base station in accordance with claim 2, wherein the transmission means includes:

first calculating means for calculating a response vector for each mobile station based on input signals inputted by each antenna and the obtained signal for each mobile station; and second calculating means for calculating, when the detecting means detects that an error has occurred for the arbitrary mobile station, the second weight vector that cancels out components of the response vectors of other mobile stations that are included in each of the input signals.

4. A wireless base station in accordance with claim 2 or claim 3, wherein the transmission means increases transmission power when transmitting a signal that has been weighted using the second weight vector.

* * * * *